Figure 1:
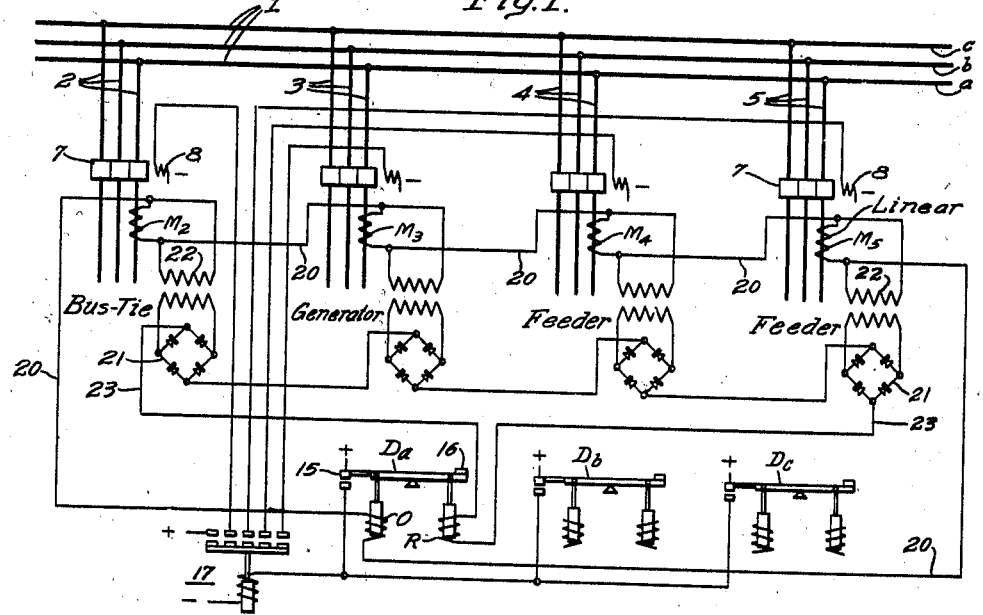

May 6, 1941.  E. L. HARDER ET AL  2,240,699
DIFFERENTIAL PROTECTIVE RELAYING
Filed Nov. 12, 1938

WITNESSES:

INVENTORS
Edwin L. Harder and
Edward H. Klemmer.
BY
O. B. Buchanan
ATTORNEY

Patented May 6, 1941

2,240,699

UNITED STATES PATENT OFFICE 2,240,699

DIFFERENTIAL PROTECTIVE RELAYING

Edwin L. Harder, Forest Hills, and Edward H. Klemmer, Wilkinsburg, Pa., assignors to Westinghouse Electric & Manufacturing Company, East Pittsburgh, Pa., a corporation of Pennsylvania Application November 12, 1938, Serial No. 239,915

24 Claims. (Cl. 175—294)

Our invention relates to protective relaying apparatus for protecting commercial electrical power-line equipment against faults.

One object of our invention is to provide a commercially practicable protective relaying equipment having ratio- or percentage-differential characteristics, for the protection of either single-phase or polyphase buses having more than two terminals or places where current is lead into or away from the bus, said terminals being either single-phase or polyphase. More generally stated, our invention relates to the relaying equipment for the protection of multi-terminal alternating-current power-apparatus of a commercial power-line frequency, said relaying equipment being generally applicable, in connection with protected apparatus having any number of terminals whatsoever—with two terminals, as in the case of the differential protection of power-transformers or generators,—or with a large number of terminals, as in the differential protection of power-line buses having a large number of sources, loads or bus-ties connected thereto. The different terminals may all be located in the same station, or they may be geographically spaced in different sub-stations, in which case the sub-stations will be joined by pilot wires or equivalent pilot channels.

A more specific object of our invention is to provide a differential protective system utilizing a differential relay of a type having an operating coil and a restraining coil, with means for vectorially adding the alternating currents at the respective terminals to provide a controlling circuit for the operating coil, and with means for first rectifying the alternating current at each terminal and then adding voltages corresponding to the rectified alternating currents to provide a circuit for controlling the energization of the restraining coil, so that the restraint shall be responsive to the arithmetical sum of the magnitudes of the several terminal currents, irrespective of their directions, as distinguished from the differential vectorial responses to the various alternating currents which have heretofore been utilized for the control of the restraining coil of similar differential relays.

A further object of our invention is to provide a differential protective system utilizing a differential relay having operating and restraining coils, with means for causing the restraining coil to be responsive to through-currents flowing into the protected electrical device at one or more input-terminals, with the distinguishing characteristic that the coupling means for the restraining coil is of relatively poor efficacy at the smaller current-values. In this way we obtain a percentage-differential relay in which the percentage of unbalance, required to operate the relay, is higher at the higher current-values than at the lower current-values, which is commonly desirable in order to prevent erroneous relay-operations in response to very heavy through-currents, while facilitating the operation of the relay for small internal-fault currents.

A further object of our invention is to utilize air-core mutual-induction coupling-devices, or, in general, coupling devices having a core of substantially constant permeance under all of the operating conditions of the device, or coupling devices for producing a measurable internal-voltage response which is at all times substantially linearly responsive to the rate of change of current in the line-conductor, as disclosed and claimed in an application of E. L. Harder, Serial No. 202,015, filed April 14, 1938, for Protective relays. In the equivalent diagram of such a coupling device, the mutual-impedance branch would have a substantially linear volt-ampere characteristic for all current-values therein, within the operating range of the device, and if this device is utilized in connection with a differential circuit, or other circuit in which the secondary current can be zero or very small, the maximum current-value in the mutual-impedance branch is the same as the maximum primary current in the equivalent diagram. To produce this linearity of response, the mutual impedance must have a substantially constant value under all induction-strength conditions.

Our invention is particularly applicable to a protective-relaying equipment for a multi-terminal polyphase electrical device which is subject to ground faults as well as phase faults, our protective relaying equipment comprising a combined phase-fault-responsive and ground-fault-responsive differential-relay means for each line-phase. In such multi-terminal polyphase electrical devices, such as multi-terminal three-phase buses or line-sections, the differential relay may be called upon to be uneffected by a through-phase-fault current of 10,000 amperes root-mean-square symmetrical value, while being sufficiently sensitive to operate on an internal-ground-fault current of 100 amperes, or only 1% of the maximum through-fault current. Thus it will be seen that, if a straight differential-protective system were utilized, a 1% error in the value of the mutual reactance of one coupling reactor compared with another, or in the relative calibrations of the current transformers in general, would produce the necessary differential of 100 amperes in the event of a maximum through-fault of 10,000 amperes, thus causing undesired tripping. In our ratio-differential protective device, assuming, for example, a 10% ratio characteristic, then under the maximum through-fault conditions the effective setting of the relay would be 10% of 10,000 amperes or 1000 amperes, and erroneous operation would be obtained only in case there were as much as a 10% manufacturing variation in supposedly identical coupling reactances. It is obviously much easier to hold the manufacturing tolerances for the coupling reactors to within 2% or 3% of a specified value, than would be the case where considerable refinements would be necessary to hold the mutual reactances of all of the coupling devices to within a fraction of 1%. The foregoing discussion illustrates the desirability of our ratio-differential characteristics.

Figure 2:
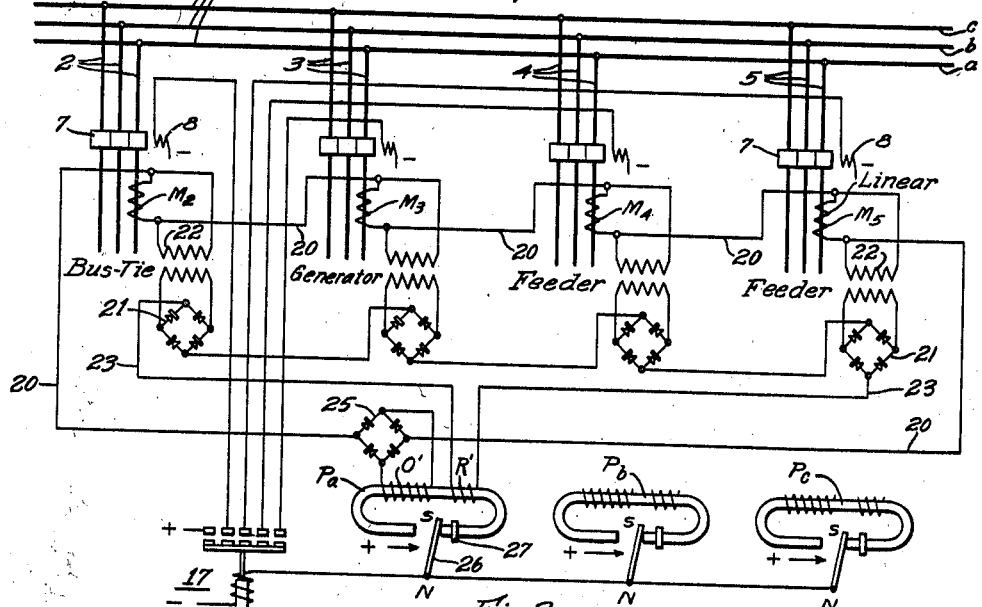
Figure 3:
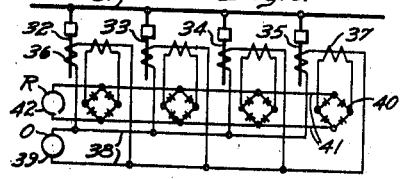

With the foregoing and other objects in view, our invention consists in the methods, circuits, systems, apparatus and combinations hereinafter described and claimed, and illustrated in the accompanying drawing, wherein;

Figure 1 is a diagrammatic view of circuits and apparatus illustrating an application of our invention to the protection of a multi-terminal three-phase bus, Fig. 2 is a similar figure illustrating a modified form of embodiment, and Fig. 3 is a simplified diagrammatic view illustrating a still further modification.

In Fig. 1, we show our invention applied to the protection of a polyphase bus 1, of an ordinary commercial power-line frequency such as 60 cycles. The polyphase bus is illustrated as having a plurality of polyphase terminals, such as a bus-tie 2, a generator-terminal 3, and two feeder-terminals 4 and 5, each terminal being provided with its own circuit breaker 7 having a trip-coil 8. A three-phase bus is illustrated, the three phase-conductors being distinguished by the letters $a$, $b$ and $c$.

According to the relaying system illustrated in Fig. 1, which is a desirable relaying system, although our invention is not limited thereto, each of the three phase-conductors of each of the terminals 2, 3, 4 and 5 is provided with its own coupling device or current-transformer $M_2$, $M_3$, $M_4$, and $M_5$, respectively. This coupling device may be a particularly well designed iron-core current-transformer of more or less conventional design, as illustrated in Fig. 3, but we prefer, at least for some applications of our invention, to utilize the substantially linearly responsive mutual-impedance device utilizing a core of non-magnetizable material or an iron core having sufficient air-gap or non-magnetizable material in series therewith to make the total permeance of the core substantially constant throughout the operative current-range of the device, thus resulting in the production of a secondary relaying voltage, as distinguished from a secondary relaying current, and at the same time securing a substantial linearity of response-ratio, as previously described, and as illustrated in Figs. 1 and 2.

In Fig. 1, the mutual coupling devices $M_2$ to $M_5$ for only phase-$a$ are shown, the other phases being omitted for the sake of simplicity, although it should be understood that similar protective equipment is provided for each of the other two phases.

The mutual coupling devices $M_2$ to $M_5$ are utilized to energize a differential relay $D_a$ which has an operating coil O and a restraining coil R, the operating coil tending to actuate the relay and close its contacts 15, whereas restraining coil R tends to prevent the operation of the relay, or to hold it open, the relay being biased toward its open position by any means such as a weight 16. It will be understood that a separate differential relay will be provided for each of the three phases, the complete energizing connections being shown only for the phase-$a$ relay $D_a$, although the other two relays are also shown, as indicated at $D_b$ and $D_c$. The operation of any one of the three differential phase-relays $D_a$, $D_b$ or $D_c$ is utilized to energize a tripping contactor 17 which energizes the tripping coils 8 of all of the circuit breakers 7.

Ordinarily, the current entering the bus 1, as through the generator-terminal 3, is exactly balanced by the current leaving the bus 1 through the other terminals such as the bus-tie terminal 2 and the two feeder terminals 4 and 5.

The operating coil O of the differential relay $D_a$ is energized so that it is differentially responsive, or responsive to the difference between the total input-current and the total output-current in its phase. If input currents are considered as flowing in a positive direction and output currents in a negative direction, then the operating coil must be responsive, in some measure, to the sum of all of the currents flowing into the bus in the phase-$a$ conductor of all of the terminals 2, 3, 4 and 5. Where the coupling devices $M_2$ to $M_5$ are of a type producing a secondary voltage, as distinguished from a secondary current, a response to the sum of all of the phase-$a$ input-currents at all of the terminals is most conveniently obtained, as a rule, by connecting the secondary circuits of the mutual coupling devices $M_2$ to $M_5$ in series, and we have adopted this series-circuit connection in the Fig. 1 embodiment of our invention, the series circuit being indicated at 20. This circuit is utilized to energize the operating coil of the differential relay $D_a$.

In accordance with our invention, the restraining coil R of the differential relay $D_a$ is energized so that it is responsive, in some measure, to the sums of the magnitudes of the currents flowing in the phase-$a$ conductor of all of the conductors 2, 3, 4 and 5, regardless of the directions of current-flow. As a convenient means to this end, we utilize a rectifier-bridge 21 for each of the phase-$a$ conductors of each of the four terminals, and we energize this rectifier-bridge 21 from the corresponding mutual coupling device $M_2$, $M_3$, $M_4$ or $M_5$, as the case may be, through an insulating transformer or mutual-impedance device 22. The rectifier-bridges 21 may advantageously be composed of copper-oxide or other contact-rectifiers, or other rectifying means may be utilized. The output-diagonals of all four of the rectifier-bridges 21 are all connected together in series with each other and with the restraining winding R of the differential relay $D_a$, by means of a series circuit 23, so that all of the rectified voltages are added cumulatively. This gives a current-response, in the restraining winding R, which is at all times responsive to the sum of the magnitudes of the phase-$a$ terminal currents, regardless of their directions.

An advantage of energizing the restraining winding R of the differential relay $D_a$ in response to the sum of the magnitudes of the terminal bus-currents, regardless of the directions of said currents, particularly in a multi-terminal protective arrangement involving more than two or three terminals, is that it provides a very convenient electric-circuit means in which the necessary responses are induced in a single circuit, so that the several responses can be suitably combined to give the desired response, with a single restraining coil or winding R on the differential relay.

By making the response dependent upon the sum of the magnitudes of the currents, regardless of their directions, we avoid the necessity for discriminating between input and output currents, which would otherwise be necessary in responding to an external fault, because the maximum available restraint should be utilized during external fault-conditions, in order to prevent an erroneous response of the differential relay. That is, during conditions when there is a fault on the system somewhere outside of the protected multi-terminal device such as the bus 1 in Fig. 1, it is, of course, necessary to prevent the operation or response of the differential relay such as the relay $D_a$. During these conditions, there will be an abnormally high current-flow in at least two or more of the terminals 2, 3, 4 and 5, and in at least one of these terminals the high fault-current is flowing into the bus, whereas, in at least one other of these terminals, the high fault-current is flowing out of the bus, so that, if the inflowing currents are called positive, the desired response would be a differential-current response. Our series circuit 23 for adding rectified voltages avoids the necessity for discriminating between inwardly and outwardly flowing currents.

The choice of contact-rectifiers for the rectifier bridges 21 is advantageous because of the limited efficiency or efficacy of these rectifiers at low current-values. Thus, assuming a value of 10 volts per rectifier-plate, as the upper permissible limit, and assuming a maximum fault-current of 10,000 amperes, so that 10 volts on the rectifier corresponds to 10,000 amperes in the associated bus-terminal, then when the bus-current drops to 1000 amperes, impressing only one volt on the rectifier, the rectifier-efficiency drops only slightly, say from 42% to 35%, thus giving a fairly uniform efficiency or efficacy of rectification, over a 10-to-1 range of currents. If the rectifier were called upon to rectify impressed alternating voltages of less than one volt, say ½ of a volt, corresponding to a 20:1 current-ratio, or 500 amperes in the bus-terminal, or any lower current-values, then the rectifier-efficiency would drop off quite a good deal at the lower current-values, so that the rectifier output-circuits would be very inefficient and would provide but very little restraint.

This inefficacy at low currents is a highly desirable characteristic, inasmuch as the cumulative response of the operating coil O to the inwardly flowing currents on the various bus-terminals is in general quite reliable only at small or normal current-values in the bus, up to the maximum power-loads on the protected device, whereas, for the very highest range of current-values, occurring under fault-conditions, a very small percentage-variation in the different mutual coupling devices $M_2$ to $M_5$ would tend to produce a sufficient current-difference to operate the relay during through-fault conditions. In other words, the percentage-differential characteristic which is conferred upon the differential relay $D_a$ by the restraining winding R is really needed only during the maximum current-conditions.

Thus, with our device, we provide a differential relay which requires, for tripping, a much higher percentage-variation in current at the high current-values than at the low current-values. Our invention thus makes the differential relay $D_a$ more sensitive to ground-faults on the protected bus 1, than to phase-faults thereon, because the ground faults are, or may be, of about the same range of value as the normal load-current values in the various branches or terminals 2, 3, 4 and 5, whereas the phase-fault currents are usually of a much higher order of magnitude.

The voltage-regulation of the output-voltages supplied to the secondary terminals of the various mutual-coupling devices $M_2$, $M_3$, $M_4$ and $M_5$, also operates in favor of a correct response of the differential relay $D_a$, enabling it to properly discriminate between internal and external faults. An ordinary current-transformer produces secondary currents which are approximately proportional, in phase and ratio, to the primary or line-currents. In the special linearly responsive mutual-reactance devices $M_2$ to $M_5$ which we prefer to utilize, the coupling device generates a secondary voltage which is responsive to the primary current, so that the terminal secondary voltage of each coupling device is subject to voltage-regulation dependent upon the magnitude of the secondary current which is caused to flow through the internal secondary impedance of the coupling device.

As long as the impedances of the loads placed upon the secondary circuits of the various coupling devices $M_2$ to $M_5$ are constant, no attention need be paid to the voltage-regulation of these coupling devices. The loads provided by the various rectifier-bridges 21 are such constant-impedance loads. This is not the case, however, of the secondary loads provided by the series operating-coil circuit 20, because, in this circuit, the secondary voltages of the various coupling devices are sometimes additive and sometimes subtractive, depending upon the line-current conditions in the various terminals, and this produces the effect of a secondary load-circuit of variable impedance. The secondary impedance becomes substantially infinite, under through-current conditions, giving a zero, or very small, secondary current when the sum of the currents flowing into the phase-$a$ conductor of the bus 1 is exactly balanced by the sum of the currents flowing away from the same, in the several terminals. On the other hand, during internal-fault conditions, the operating coil O draws a secondary current of very definite magnitude from the secondary terminals of the various coupling devices $M_2$ to $M_5$, thus tending to reduce the secondary output-voltages which appear at the secondary terminals of these various coupling devices. It will be noted, however, that these coupling-device voltages are reduced only during internal-fault conditions, at which time it is very necessary for the differential relay $D_a$ to operate, so that any reduction in the energization of the restraining winding R, below that which it would have if it were not for the above-described voltage-regulation effect of the mutual coupling devices, makes it just that much easier for the differential relay $D_a$ to respond by closing its relay-contacts 15.

Fig. 2 shows another form of embodiment of our invention, in which, instead of utilizing a balanced-beam type of differential relay such as $D_a$, $D_b$ or $D_c$, or a relay in which two separate mechanical forces are developed, one responsive to the energization of the operating coil O, and the other responsive to the energization of a restraining coil R, we may utilize polarized relays $P_a$, $P_b$ and $P_c$. According to the diagrammatic representation of the polarized relay $P_a$ in Fig. 2, the restraining coil R' is energized as previously described for the restraining coil R in Fig. 1, whereas the operating coil O' is energized from the previously described series circuit 20, through a rectifier-bridge 25. The operating and restraining coils O' and R' are placed on a common magnetic circuit which operates on a polarized or magnetized movable armature 26 so as to either tend to hold said armature in its non-operated position or to tend to move said armature to its operated position in which it makes contact with the positive battery-terminal (+), according to the relative magnitudes of the ampere-turns in the respective windings. The directions of current-flow are such as to cause the operating coil O' to tend to cause an operation of the relay in response to the vectorial sum of the terminal-currents flowing into the bus at the respective terminals, and to cause the restraining coil R' to tend to restrain the operation of the relay in response to the arithmetical sum of the numerical or scalar values of the terminal-currents, irrespective of their directions, said numerical values being obtained by means of the individual rectifier-bridges 21. A response of any one of the differential polarized relays $P_a$, $P_b$ or $P_c$ in Fig. 2, is utilized to energize the tripping contactor 17, as in Fig. 1.

The rectifying-bridge 25, in Fig. 2, may advantageously, although not necessarily, be made of individual rectifier-elements having a good efficacy over a wider current-range than the rectifier-elements of the bridges 21.

The polarized relays, such as $P_a$, are preferably also provided with a short-circuited coil or loop 27 for the purpose of retarding the rapidity with which flux-changes may be made in the field-member of the relay in response to variations in the current-energization of the operating and restraining coils O' and R', respectively. This provision is desirable, in permitting the polarized relay to be adjusted so that it has a very high sensitivity, while at the same time preventing faulty operations due to very brief line-transients resulting from conditions other than fault-conditions.

In accordance with our invention, we are enabled to utilize a ratio-differential response in which the setting of the relay corresponds, for example, to a 10% difference between the input and output currents under the maximum through-fault conditions, so that it would require a 10% variation in the equivalent mutual coupling impedances of the various mutual coupling devices $M_2$ to $M_5$ in order to cause misoperation of the differential relay. It will be obvious that this provides a high factor of safety if the manufacturing conditions under which the mutual coupling devices $M_2$ to $M_5$ are made are held sufficiently constant so that the mutual impedances of these devices are all identical within 2% or 3%, which is quite a different proposition from attempting to hold the mutual impedances constant to within a fraction of 1%, as would be necessary with a straight differential relay having only an operating coil, without the restraining coil, and with a ratio of 100-to-1 between the maximum through-fault current and the minimum internal ground-fault current obtainable within the protected apparatus such as the multi-terminal bus 1. It is not at all unusual to encounter a protected device in which the phase-fault current may reach 10,000 amperes, while a ground-fault current may have only 1% of that value, or 100 amperes.

In Fig. 3, we have schematically indicated a connection-system suitable for current-transformers of the usual type producing a relaying current rather than a relaying voltage. In this figure, a bus 31 is illustrated with four terminals 32, 33, 34 and 35, each having an ordinary line-current transformer 36 producing a relaying current which is fed through an auxiliary current-transformer 37 and thence to a relaying bus 38, with all four of the line-current transformers 37 connected in parallel as is usual in summating the outputs of current-transformers. The relaying bus 38 energizes the operating coil 39, designated O, of the percentage-differential relay. The auxiliary current transformers 37 are associated, as before, with their individual rectifier-bridges 40, the output-diagonals of which are now connected in parallel with each other, across a second relaying bus 41, instead of the series connection which is shown in Figs. 1 and 2. The second relaying bus 40, in Fig. 3, energizes the restraint-coil 42, designated R, of the percentage-differential relay.

While we have illustrated and described our invention in three forms of embodiment, by way of example, we wish it to be understood that our invention is susceptible of various changes in its precise forms of embodiment, without departing from some of the essential features of the invention. We desire, therefore, that the appended claims shall be accorded the broadest construction consistent with their language and the prior art.

We claim as our invention:

1. Relaying equipment for an alternating-current electrical device having a plurality of terminals, said relaying equipment comprising a current-responsive coupling device associated with each of the plurality of terminals, each coupling device deriving an alternating electrical quantity responsive, in a predetermined manner, to a current-condition in its associated terminal, electric-circuit means for vectorially combining all of the alternating electrical quantities to obtain a first resultant electrical relaying quantity, current-responsive-coupling, current-modifying, and summation means, associated with all of the several terminals, for deriving a second resultant electrical relaying quantity responsive, in a predetermined manner, to the arithmetical sum of the magnitudes of all of the terminal-currents regardless of their directions, differential-relay means having a relay-operating circuit and a relay-restraining circuit, and means for energizing said relay-operating circuit so as to be predeterminedly responsive, in some measure, to said first resultant relaying quantity, and means for energizing said relay-restraining circuit so as to be predeterminedly responsive, in some measure, to said second resultant relaying quantity.

2. Relaying equipment for an alternating-current electrical device having a plurality of terminals, said relaying equipment comprising a current-responsive coupling device associated with each of the plurality of terminals, each coupling device deriving an alternating electrical quantity responsive, in a predetermined manner, to a current-condition in its associated terminal, electric-circuit means for vectorially combining all of the alternating electrical quantities to obtain a first resultant electrical relaying quantity, a current-responsive coupling means and a rectifying means associated with each of the plurality of terminals for deriving a unidirectional electrical quantity responsive, in a predetermined manner, to a current-condition in its associated terminal, electric-circuit means for arithmetically adding all of the unidirectional electrical quantities to obtain a second resultant electrical relaying quantity, differential-relay means having a relay-operating circuit and a relay-restraining circuit, means for energizing said relay-operating circuit so as to be predeterminedly responsive, in some measure, to said first resultant relaying quantity, and means for energizing said relay-restraining circuit so as to be predeterminedly responsive, in some measure, to said second resultant relaying quantity.

3. Differential protective apparatus for an alternating-current electrical device having a plurality of terminals, said apparatus comprising means for providing a first relaying circuit predeterminedly responsive, in some measure, to fault-currents flowing into the protected electrical device at a plurality of terminals thereof, means for providing a second relaying circuit predeterminedly responsive, in some measure, to through-currents flowing into the protected electrical device, differential-relay means having a relay-operating circuit and a relay-restraining circuit, coupling means of relatively good efficacy at at least the smaller current-values, for causing said relay-operating circuit to be so energized as to be predeterminedly responsive, in some measure, to said first relaying circuit, and coupling means of relatively poor efficacy at the smaller current-values, and of relatively good efficacy at the higher current-values, for causing said relay-restraining circuit to be so energized as to be predeterminedly responsive, in some measure, to said second relaying circuit.

4. Differential protective apparatus for an alternating-current electrical device having a plurality of terminals, said apparatus comprising coupling means of relatively good efficacy at at least the smaller current-values, for providing a first relaying circuit predeterminedly responsive, in some measure, to fault-currents flowing into the protected electrical device at a plurality of terminals thereof, coupling means of relatively poor efficacy at the smaller current-values, and of relatively good efficacy at the higher current-values, for providing a second relaying circuit predeterminedly responsive, in some measure, to through-currents flowing into the protected electrical device, differential-relay means having a relay-operating circuit and a relay-restraining circuit, and means for energizing said relay-operating and relay-restraining circuits so as to be responsive, in some measure, to said first and second relaying circuits, respectively.

5. Differential protective apparatus for an alternating-current electrical device having a plurality of terminals, said apparatus comprising current-responsive means associated with each terminal of the protected electrical device, means for totalizing the current-responses of all of said current-responsive means, and fault-responsive means for utilizing said totalized responses in the detection of faulty conditions in the protected electrical device, said fault-detection means comprising a differential relay having an alternating-current operating coil and a uni-directional-current restraining coil, operating-coil energizing means including an alternating-current relaying source for causing said operating coil to be responsive, in some measure, to fault-currents flowing into the protected electrical device at all terminals thereof, and restraining-coil energizing means including an alternating-current relaying-source and a rectifying means for causing said restraining coil to be responsive, in some measure, to through-currents flowing into the protected electrical device, said rectifying means being of relatively small efficacy at relatively small current-strengths.

6. The invention as defined in claim 1, characterized by said means for deriving the second resultant relaying quantity being of relatively small efficacy at relatively small currents.

7. The invention as defined in claim 2, characterized by said rectifying means being of relatively small efficacy at relatively small currents.

8. Relaying equipment for an alternating-current electrical device having a plurality of terminals, said relaying equipment comprising a current-responsive coupling device associated with each of the plurality of terminals, each coupling device deriving an alternating electrical quantity responsive, in a predetermined manner, to a current-condition in its associated terminal, electric-circuit means for vectorially combining all of the alternating electrical quantities to obtain a resultant electrical relaying quantity, a current-responsive coupling means and a rectifying means associated with said alternating-current electrical device for deriving a unidirectional electrical quantity responsive, in a predetermined manner, to a current-condition in its associated terminal, said rectifying means being of relatively small efficacy at relatively small currents, differential-relay means having a relay-operating circuit and a relay-restraining circuit, means for energizing said relay-operating circuit so as to be predeterminedly responsive, in some measure, to said resultant relaying quantity, and means for energizing said relay-restraining circuit so as to be predeterminedly responsive, in some measure, to said unidirectional electrical quantity.

9. A commercially practicable differential-protection device for a multi-terminal alternating-current power-apparatus of a commercial power-line frequency, comprising, in combination, differential-relay means having a relay-operating circuit and a relay-restraining circuit, a current-responsive coupling device associated with each of the plurality of terminals of the protected apparatus, summation means for deriving a measurable voltage which is responsive, in some measure, to the instantaneous sum of the several coupling-device responses, integrated over the operating time of the differential-relay means, means for causing the relay-operating circuit to be so energized that it is predeterminedly responsive, in some measure, to said sum, and means for causing the relay-restraining circuit to be so energized that it is non-linearly responsive, in some measure, to a terminal-current condition in the protected apparatus, said non-linear response being disproportionately weak for the weaker current-strengths.

10. A commercially practicable differential-protection device for a multi-terminal alternating-current power-apparatus of a commercial power-line frequency, comprising, in combination, differential-relay means having a relay-operating circuit and a relay-restraining circuit, a current-responsive coupling device associated with each of the plurality of terminals of the protected apparatus, summation means for deriving a measurable voltage which is responsive, in some measure, to the instantaneous sum of the several coupling-device responses, integrated over the operating time of the differential-relay means, means for causing the relay-operating circuit to be so energized that it is predeterminedly responsive, in some measure, to said sum, and associated current-responsive coupling means and rectifying means associated with the protected apparatus for causing the relay-restraining circuit to be predeterminedly responsive, in some measure, to the rectified-current output of said associated current-responsive coupling means and rectifying means.

11. A commercially practicable differential-protection device for a multi-terminal alternating-current power-apparatus of a commercial power-line frequency, comprising, in combination, differential-relay means having a relay-operating circuit and a relay-restraining circuit, a current-responsive mutual-inductance coupling device associated with each of the plurality of terminals of the protected apparatus, each coupling device producing a measurable internal-voltage response which is at all times substantially linearly responsive to the rate of change of current flowing into or out of the protected apparatus at that terminal, the mutual-impedance branch of the equivalent diagram of each coupling device having a substantially linear volt-ampere characteristic for all current-values therein within the operating range of the device, summation means for deriving a measurable voltage which is responsive, in some measure, to the instantaneous sum of the several coupling-device responses, integrated over the operating time of the differential-relay means, means for causing the relay-operating circuit to be so energized that it is predeterminedly responsive, in some measure, to said sum, and means for causing the relay-restraining circuit to be so energized that it is non-linearly responsive, in some measure, to a terminal-current condition in the protected apparatus, said non-linear response being disproportionately weak for the weaker current-strengths.

12. A commercially practicable differential-protection device for a multi-terminal alternating-current power-apparatus of a commercial power-line frequency, comprising, in combination, differential-relay means having a relay-operating circuit and a relay-restraining circuit, a current-responsive mutual-inductance coupling device associated with each of the plurality of terminals of the protected apparatus, each coupling device producing a measurable internal-voltage response which is at all times substantially linearly responsive to the rate of change of current flowing into or out of the protected apparatus at that terminal, the mutual-impedance branch of the equivalent diagram of each coupling device having a substantially linear volt-ampere characteristic for all current-values therein within the operating range of the device, summation means for deriving a measurable voltage which is responsive, in some measure, to the instantaneous sum of the several coupling-device responses, integrated over the operating time of the differential-relay means, means for causing the relay-operating circuit to be so energized that it is predeterminedly responsive, in some measure, to said sum, and associated current-responsive coupling means and rectifying means associated with the protected power apparatus causing the relay-restraining circuit to be predeterminedly responsive, in some measure, to the rectified-current output of said associated current-responsive coupling means and rectifying means.

13. Protective relaying equipment for a multi-terminal polyphase electrical device which is subject to ground faults as well as phase faults, said relaying equipment comprising, in combination, a separate relaying equipment for each phase comprising a current-responsive coupling device associated with the corresponding phase-conductor of each of the plurality of terminals, each coupling device deriving an alternating electrical quantity responsive, in a predetermined manner, to a current-condition in its associated phase-conductor, electric-circuit means for vectorially combining all of the alternating electrical quantities of said phase to obtain a first resultant electrical relaying quantity, current-responsive - coupling, current - modifying, and summation means, associated with the corresponding phase-conductors of all of the several terminals, for deriving a second resultant electrical relaying quantity responsive, in a predetermined manner, to the arithmetical sum of the magnitudes of all of the terminal-currents regardless of their directions, a combined phase-fault-responsive and ground-fault-responsive differential-relay means for said phase, said differential-relay means having a relay-operating circuit and a relay-restraining circuit, and means for energizing said relay-operating circuit so as to be predeterminedly responsive, in some measure, to said first resultant relaying quantity, and means for energizing said relay-restraining circuit so as to be predeterminedly responsive, in some measure, to said second resultant relaying quantity.

14. Protective relaying equipment for a multi-terminal polyphase electrical device which is subject to ground faults as well as phase faults, said relaying equipment comprising in combination, a separate relaying equipment for each phase comprising a current-responsive coupling device associated with the corresponding phase-conductor of each of the plurality of terminals, each coupling device deriving an alternating electrical quantity responsive, in a predetermined manner, to a current-condition in its associated phase-conductor, electric-circuit means for vectorially combining all of the alternating electrical quantities of said phase to obtain a first resultant electrical relaying quantity, a current-responsive coupling means and a rectifying means associated with said phase-conductor of each of the plurality of terminals, for deriving a unidirectional electrical quantity responsive, in a predetermined manner, to a current condition in its associated phase-conductor, electric-circuit means for arithmetically adding all of the unidirectional electrical quantities to obtain a second resultant electrical relaying quantity, a combined phase-fault-responsive and ground-fault-responsive differential-relay means for said phase, said differential-relay means having a relay-operating circuit and a relay-restraining circuit, means for energizing said relay-operating circuit so as to be predeterminedly responsive, in some measure, to said first resultant relaying quantity, and means for energizing said relay-restraining circuit so as to be predeterminedly responsive, in some measure, to said second resultant relaying quantity.

15. Protective relaying equipment for a multi-terminal polyphase electrical device which is subject to ground faults as well as phase faults, said relaying equipment for each phase comprising means for providing a first relaying circuit predeterminedly responsive, in some measure, to fault-currents flowing into said phase of the protected electrical device at a plurality of terminals thereof, means for providing a second relaying circuit predeterminedly responsive, in some measure, to through-currents flowing into said phase of the protected electrical device, a combined phase-fault-responsive and ground-fault-responsive differential-relay means for said phase, said differential-relay means having a relay-operating circuit and a relay-restraining circuit, coupling means of relatively good efficacy at at least the smaller current-values, for causing said relay-operating circuit to be so energized as to be predeterminedly responsive, in some measure, to said first relaying circuit, and coupling means of relatively poor efficacy at the smaller current-values, and of relatively good efficacy at the higher current-values, for causing said relay-restraining circuit to be so energized as to be predeterminedly responsive, in some measure, to said second relaying circuit.

16. Protective relaying equipment for a multi-terminal polyphase electrical device which is subject to ground faults as well as phase faults, said relaying equipment comprising, in combination, a separate relaying equipment for each phase comprising coupling means of relatively good efficacy at at least the smaller current-values, for providing a first relaying circuit predeterminedly responsive, in some measure, to fault-currents flowing into said phase of the protected electrical device at a plurality of terminals thereof, coupling means of relatively poor efficacy at the smaller current-values, and of relatively good efficacy at the higher current-values, for providing a second relaying circuit predeterminedly responsive, in some measure, to through-currents flowing into said phase of the protected electrical device, a combined phase-fault-responsive and ground-fault-responsive differential-relay means for said phase, said differential-relay means having a relay-operating circuit and a relay-restraining circuit, and means for energizing said relay-operating and relay-restraining circuits so as to be responsive, in some measure, to said first and second relaying circuits, respectively.

17. Protective relaying equipment for a multi-terminal polyphase electrical device which is subject to ground faults as well as phase faults, said relaying equipment comprising, in combination, a separate relaying equipment for each phase comprising current-responsive means associated with said phase-conductor of each of the plurality of terminals, means for totalizing the current-responses of all of said current-responsive means for said phase, and fault-responsive means for utilizing said totalized responses in the detection of faulty conditions in the protected electrical device, said fault-detection means comprising a combined phase-fault-responsive and ground-fault-responsive differential relay for said phase, said differential relay having an alternating-current operating coil and a unidirectional-current restraining coil, operating-coil energizing means including an alternating-current relaying source for causing said operating coil to be responsive, in some measure, to fault-currents flowing into said phase of the protected electrical device at all terminals thereof, and restraining-coil energizing means including an alternating-current relaying-source and a rectifying means for causing said restraining coil to be responsive, in some measure, to through-currents flowing into said phase of the protected electrical device, said rectifying means being of relatively small efficacy at relatively small current-strengths.

18. The invention as defined in claim 13, characterized by said means for deriving the second resultant relaying quantity being of relatively small efficacy at relatively small currents.

19. The invention as defined in claim 14, characterized by said rectifying means being of relatively small efficacy at relatively small currents.

20. Protective relaying equipment for a multi-terminal polyphase electrical device which is subject to ground faults as well as phase faults, said relaying equipment comprising, in combination, a separate relaying equipment for each phase comprising a current-responsive coupling device associated with the corresponding phase-conductor of each of the plurality of terminals, each coupling device deriving an alternating electrical quantity responsive, in a predetermined manner, to a current-condition in its associated phase-conductor, electric-circuit means for vectorially combining all of the alternating electrical quantities of said phase to obtain a resultant electrical relaying quantity, a current-responsive coupling means and a rectifying means associated with said phase-conductor of the protected electrical device, for deriving a unidirectional electrical quantity responsive, in a predetermined manner, to a current-condition in its associated phase-conductor, said rectifying means being of relatively small efficacy at relatively small currents, a combined phase-fault-responsive and ground-fault-responsive differential-relay means for said phase, said differential-relay means having a relay-operating circuit and a relay-restraining circuit, means for energizing said relay-operating circuit so as to be predeterminedly responsive, in some measure, to said resultant relaying quantity, and means for energizing said relay-restraining circuit so as to be predeterminedly responsive, in some measure, to said unidirectional electrical quantity.

21. Protective relaying equipment for a multi-terminal polyphase power-apparatus of a commercial power-line frequency, said protected apparatus being subject to ground faults as well as phase faults, said relaying equipment comprising, in combination, a separate relaying equipment for each phase comprising a combined phase-fault-responsive and ground-fault-responsive differential-relay means for said phase, said differential-relay means having a relay-operating circuit and a relay-restraining circuit, a current-responsive coupling device associated with said phase of each of the plurality of terminals of the protected apparatus, summation means for deriving a measurable voltage which is responsive, in some measure, to the instantaneous sum of the several coupling-device responses for said phase, integrated over the operating time of the differential-relay means, means for causing the relay-operating circuit to be so energized that it is predeterminedly responsive, in some measure, to said sum, and means for causing the relay-restraining circuit to be so energized that it is non-linearly responsive, in some measure, to a terminal-current condition in said phase of the protected apparatus, said non-linear response being disproportionately weak for the weaker current-strengths.

22. Protective relaying equipment for a multi-terminal polyphase power-apparatus of a commercial power-line frequency, said protected apparatus being subject to ground faults as well as phase faults, said relaying equipment comprising, in combination, a separate relaying equipment for each phase comprising a combined phase-fault-responsive and ground-fault-responsive differential-relay means for said phase, said differential-relay means having a relay-operating circuit and a relay-restraining circuit, a current-responsive coupling device associated with said phase of each of the plurality of terminals of the protected apparatus, summation means for deriving a measurable voltage which is responsive, in some measure, to the instantaneous sum of the several coupling-device responses for said phase integrated over the operating time of the differential-relay means, means for causing the relay-operating circuit to be so energized that it is predeterminedly responsive, in some measure, to said sum, and associated current-responsive coupling means and rectifying means associated with said phase of the protected apparatus for causing the relay-restraining circuit to be predeterminedly responsive, in some measure, to the rectified-current output of said associated current-responsive coupling means and rectifying means.

23. Protective relaying equipment for a multi-terminal polyphase power-apparatus of a commercial power-line frequency, said protected apparatus being subject to ground faults as well as phase faults, said relaying equipment comprising, in combination, a separate relaying equipment for each phase comprising a combined phase-fault-responsive and ground-fault-responsive differential-relay means for said phase, said differential-relay means having a relay-operating circuit and a relay-restraining circuit, a current-responsive mutual-inductance coupling device associated with said phase of each of the plurality of terminals of the protected apparatus, each coupling device producing a measurable internal-voltage response which is at all times substantially linearly responsive to the rate of change of current flowing into or out of its phase of the protected apparatus at that terminal, the mutual-impedance branch of the equivalent diagram of each coupling device having a substantially linear volt-ampere characteristic for all current-values therein within the operating range of the device, summation means for deriving a measurable voltage which is responsive, in some measure, to the instantaneous sum of the several coupling-device responses for said phase integrated over the operating time of the differential-relay means, means for causing the relay-operating circuit to be so energized that it is predeterminedly responsive, in some measure, to said sum, and means for causing the relay-restraining circuit to be so energized that it is non-linearly responsive, in some measure, to a terminal-current condition in said phase of the protected apparatus, said non-linear response being disproportionately weak for the weaker current-strengths.

24. Protective relaying equipment for a multi-terminal polyphase power-apparatus of a commercial power-line frequency, said protected apparatus being subject to ground faults as well as phase faults, said relaying equipment comprising, in combination, a separate relaying equipment for each phase comprising a combined phase-fault-responsive and ground-fault-responsive differential-relay means for said phase, said differential-relay means having a relay-operating circuit and a relay-restraining circuit, a current-responsive mutual-inductance coupling device associated with said phase of each of the plurality of terminals of the protected apparatus, each coupling device producing a measurable internal-voltage response which is at all times substantially linearly responsive to the rate of change of current flowing into or out of its phase of the protected apparatus at that terminal, the mutual-impedance branch of the equivalent diagram of each coupling device having a substantially linear volt-ampere characteristic for all current-values therein within the operating range of the device, summation means for deriving a measurable voltage which is responsive, in some measure, to the instantaneous sum of the several coupling-device responses for said phase integrated over the operating time of the differential-relay means, means for causing the relay-operating circuit to be so energized that it is predeterminedly responsive, in some measure, to said sum, and associated current-responsive coupling means and rectifying means associated with said phase of the protected apparatus for causing the relay-restraining circuit to be predeterminedly responsive, in some measure, to the rectified-current output of said associated current-responsive coupling means and rectifying means.

EDWIN L. HARDER.
EDWARD H. KLEMMER.